(12) United States Patent
Susanto et al.

(10) Patent No.: US 8,879,926 B2
(45) Date of Patent: Nov. 4, 2014

(54) COMMUNICATING BETWEEN AN OPTICAL RECEIVER AND AN OPTICAL TRANSMITTER USING A SERIAL BUS

(75) Inventors: Tony Susanto, Austin, TX (US);
Zhonghong Shen, Austin, TX (US);
Tihsiang Hsu, Austin, TX (US)

(73) Assignee: SMSC Holdings S.A.R.L., Luxembourg (LU)

( * ) Notice: Subject to any disclaimer, the term of this patent is extended or adjusted under 35 U.S.C. 154(b) by 85 days.

(21) Appl. No.: 13/406,721

(22) Filed: Feb. 28, 2012

(65) Prior Publication Data

US 2013/0071125 A1    Mar. 21, 2013

Related U.S. Application Data

(60) Provisional application No. 61/535,817, filed on Sep. 16, 2011.

(51) Int. Cl.

| H04B 10/06 | (2006.01) |
| H04B 10/00 | (2013.01) |
| H04B 10/04 | (2006.01) |
| H04B 10/12 | (2006.01) |
| H04B 10/40 | (2013.01) |
| G02B 6/42 | (2006.01) |

(52) U.S. Cl.
CPC .............. *G02B 6/4292* (2013.01); *H04B 10/40* (2013.01); *G02B 6/423* (2013.01); *G02B 6/4246* (2013.01)
USPC .......................... 398/202; 398/135; 398/182

(58) Field of Classification Search
USPC .............. 398/156, 106, 135–140, 154, 160.5, 398/182, 202
See application file for complete search history.

(56) References Cited

U.S. PATENT DOCUMENTS

| 6,512,617 B1 | 1/2003 | Tanji et al. |
| 6,912,361 B2 | 6/2005 | Aronson et al. |
| 7,218,670 B1 * | 5/2007 | Lesea et al. ................... 375/226 |
| 7,359,643 B2 | 4/2008 | Aronson et al. |
| 7,580,638 B2 | 8/2009 | Aronson et al. |
| 7,660,532 B2 | 2/2010 | Chiu et al. |
| 7,792,429 B2 | 9/2010 | Park et al. |
| 7,903,981 B2 | 3/2011 | Cho et al. |
| 8,045,860 B2 | 10/2011 | Matsui et al. |
| 8,155,536 B2 | 4/2012 | Wu et al. |
| 2004/0008996 A1 | 1/2004 | Aronson et al. .............. 398/202 |
| 2004/0033079 A1 * | 2/2004 | Sheth et al. ................... 398/135 |
| 2005/0223208 A1 * | 10/2005 | Moran et al. ...................... 713/1 |
| 2008/0008469 A1 * | 1/2008 | Yokoyama ...................... 398/16 |
| 2009/0028574 A1 | 1/2009 | Dybsetter et al. ............. 398/135 |
| 2012/0017118 A1 * | 1/2012 | Barakat et al. .................. 714/37 |

OTHER PUBLICATIONS

International Search Report and Written Opinion, Application No. PCT/US2012/051567, 10 pages, Feb. 14, 2013.

\* cited by examiner

*Primary Examiner* — David Payne
*Assistant Examiner* — Casey Kretzer
(74) *Attorney, Agent, or Firm* — King & Spalding L.L.P.

(57) ABSTRACT

An optical receiver, within a first device, may receive first configuration information from an optical transmitter, also within the first device. While receiving the first configuration information, the optical receiver may operate according to a clock. Later, the optical receiver may receive optical data from a second device according to the first configuration. While receiving the optical data from the second device, the optical receiver does not operate according to the clock, wherein the optical receiver not operating according to the clock allows the optical receiver to receive the optical data with greater sensitivity.

19 Claims, 6 Drawing Sheets

COMMUNICATING BETWEEN AN OPTICAL RECEIVER AND AN OPTICAL TRANSMITTER USING A SERIAL BUS

PRIORITY INFORMATION

This application claims benefit of priority of U.S. provisional application Ser. No. 61/535,817 titled "Alignment of Optical Sensors" filed Sep. 16, 2011, whose inventors were Tony Susanto, Zhonghong Shen, Tihsiang Hsu, Markus N. Becht, Galin I. Ivanov and Evan L. Marchman, which is hereby incorporated by reference in its entirety as though fully and completely set forth herein.

FIELD OF THE INVENTION

The present invention relates to the field of data communications, and more particularly to optical communication between devices.

DESCRIPTION OF THE RELATED ART

In recent years communication between devices has become both prevalent and necessary. In some systems, devices may communicate via optical means, e.g., using optical cables and optical transceivers. In some cases, these devices may communicate in a ring network, where data from a source device to a destination device may pass through several intermediate devices. Each device may analyze the data to determine whether or not data in the transmission is targeted to itself and either accept that data or pass it to the next member in the ring.

In such configurations, and in data communication in general, the signal to noise ratio may be very low. Accordingly, distinguishing the data from the noise may be difficult. Accordingly, improvements in data transmission and reception are desired.

SUMMARY OF THE INVENTION

Various embodiments of a system and method for performing optical communication are presented below.

An optical transceiver may be included in a first device, e.g., as a chip within the first device. The optical transceiver may be coupled to a controller or network interface chip of the first device. The first device may be coupled to several other devices in a network, e.g., a ring network. In one embodiment, the first device may communicate with the other devices within the network uses optical signals. Thus, optical data on the network may be received and transmitted by the transceiver of the first device. The transceiver may include a transmitter and a receiver.

At a first time, e.g., during or proximate to a power up of the transceiver or first device, the transmitter may provide configuration information to the receiver. For example, the transmitter may determine that the receiver is powered, and may then provide configuration information to the receiver. In one embodiment, the transmitter may provide the configuration information using a serial bus, e.g., where the transmitter and receiver each have a respective serial peripheral interface (SPI). During this transmission, the receiver may operate or receive the data using a clock, e.g., which is provided by the transmitter over the serial bus. Additionally, during this transmission, various oscillations (e.g., digital oscillations), electronic state changes (e.g., digital state changes), flip flop transitions, etc. may occur for the receiver.

During and/or after transmission, the receiver may configure itself according to the received configuration. For example, in one embodiment, the transmission may result in storage of the configuration information in various registers (e.g., configuration registers) of the receiver. In one embodiment, the data for each register may be provided on each clock signal. Accordingly, the receiver may only configure itself if the number of clock signals match the number of registers.

After configuration, the receiver may receive optical data, e.g., from another device on the network. While receiving the optical data, the receiver may operate "quietly". For example, the receiver may not receive the clock from the transmitter while receiving the optical data. In one embodiment, no (or limited) oscillations (e.g., digital oscillations) may occur on the receiver while receiving the optical data or subsequent to the transmission of configuration information from the transmitter. Additionally, or alternatively, no state changes (e.g., digital state changes), flip flop transitions, analog to digital or digital to analog conversions, etc. may occur on the receiver so that it may receive and detect optical signals of the optical data with greater sensitivity.

While the above is discussed with respect to an initial configuration (e.g., based on calibrations that may have been performed during testing), configurations may also be provided at other times, e.g., during operation, such as in response to changes to the quality of received optical signals. For example, in response to a change in quality of the optical signals, a second configuration may be received and used by the receiver. Accordingly, during reception a noisier environment may be required (e.g., as a result of using the clock provided by the transmitter), but may become quiet after the transmission is complete. The new configuration may be based on a calibration procedure, e.g., determined by the receiver, transmitter, and/or controller based on current conditions. Thus, configurations may be provided to the receiver during operation, e.g., in a dynamic fashion.

The receiver may also be configured to provide information indicating optical power (e.g., of currently received optical signals) to the transmitter. For example, the receiver may include an analog interface which is able to provide an analog signal indicating the current optical power to the transmitter. In some embodiments, this transmission may occur over a serial bus using respective SPIs.

The transmitter, in turn, may provide an indication of the optical power to the controller or network interface chip of the first device. For example, the transmitter may receive the analog signal (e.g., indicated by a voltage or current) and perform analog to digital conversion to generate a digital signal that indicates the optical power. Accordingly, the transmitter may provide the digital signal to the controller or network interface chip of the first device.

BRIEF DESCRIPTION OF THE DRAWINGS

A better understanding of the present invention can be obtained when the following detailed description of the preferred embodiment is considered in conjunction with the following drawings, in which.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Hardware Configuration Program—a program, e.g., a netlist or bit file, that can be used to program or configure a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Optical Device—any of various devices which are capable of performing optical communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
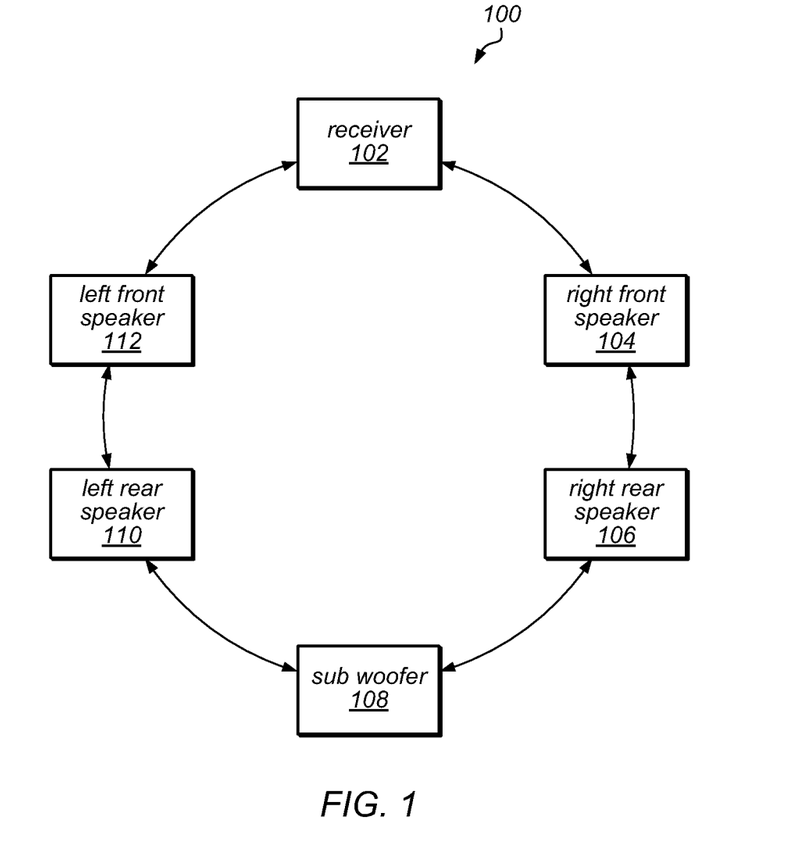
FIG. 1 illustrates an exemplary ring network for a set of devices, according to one embodiment.

FIG. 1—Exemplary Ring Network

FIG. 1 illustrates an exemplary ring network 100 having a plurality of devices coupled together in a ring arrangement. More specifically, the network 100 of FIG. 1 is an exemplary network involving a plurality of audio devices, e.g., within an automobile. As shown, the network 100 includes a receiver 102 coupled to right front speaker 104, which is in turn coupled to right rear speaker, which is in turn coupled to sub woofer 108, which is in turn coupled to left rear speaker 110, which is in turn coupled to left front speaker 112, which is also coupled to the receiver 102.

In the exemplary embodiment of FIG. 1, the network 100 may be an optical network where each device communicates over the network 100 using optical communication. For example, each device may be coupled to its neighboring devices using an optical connection, such as optical fiber.

In one embodiment, the network 100 may be a MOST network that utilizes the MOST application framework. Generally, a MOST network may have a maximum of 64 nodes per ring, a maximum distance of 10 m between two nodes, and may be used in a point-to-point optical network, e.g., such as shown in FIG. 1. The MOST application framework is a set of object oriented, reusable components to design multimedia systems in automotive environment, but also in similar other application areas. In a classically wired system, each device may be controlled by an individual cable, such that the wiring harness will grow with each new device that is added to the system. Accordingly, the devices each have proprietary connections and systems. These proprietary systems force a controlling device to handle many different interfaces and protocols.

In a networked system, such as in FIG. 1, each device may be identified by a unique address and shares various data with a common connection. Devices can be controlled by a dedicated master (e.g., the receiver 102), but can also exchange information with each other. An advantage of a networked system is that the communication paths are defined. Therefore, developers can focus on the product functionality instead of continuously adapting their interfaces to the HMI.

The MOST application framework is independent from devices and network, allows use of functional modeling (e.g., fblocks, functions, etc.), provides hierarchical system management (e.g., masters, controllers, slaves, etc.), provides service discovery and plug and play mechanisms, provides modularity and reusability (e.g., of (blocks), and may provide free partitioning and easy repartitioning (e.g., of fblocks), among other advantages.

In the exemplary network 100 of FIG. 1, audio data may be provided from the receiver to the left front speaker 112 and/or the right front speaker 104. The audio data may include data for one or more (or each of) the right front speaker 104, the right rear speaker 106, the sub woofer 108, the left rear speaker 110, or the left front speaker 112. Accordingly, the right front speaker 104 may receive the audio data over the network, determine if any portion of the audio data is addressed or intended for the right front speaker 104 and pass the data on to right rear speaker 106, which may perform the same operations, continuing through the rest of the devices in the network 100. Alternatively, or additionally, the same procedures may be performed starting with the left front speaker 112 through the right front speaker 104 in the opposite direction. In various embodiments, the directionality of data may be clockwise, counter-clockwise, or both in the ring network 100.

While FIG. 1 shows a typical ring network, note that in various other embodiments, different networks may be used. For example, the network 100 may be configured as a star network (e.g., having a centralized controller or hub) or may be a hybrid network, e.g., where a portion of the network uses a star configuration and another portion uses a ring configuration. Additionally, the particular devices and implementations of FIG. 1 are exemplary only. Virtually any type of devices may be used in a ring network, instead of, or in addition to, the audio devices shown in FIG. 1. For example, the devices in the network could include video devices, GPS devices, cameras, driver assist devices, CD changers, cell phones, tablets, computer systems, are any desired device. Thus, the network may be used to transmit any of a plurality of different types of data, such as video data, GPS data, driver assist data, etc. Thus, the network 100 and devices shown in FIG. 1 are exemplary only and may be implemented according various different configurations and may include any of a variety of desired devices.

Thus, FIG. 1 is an exemplary network which includes devices that may operate as described herein.

Figure 2:
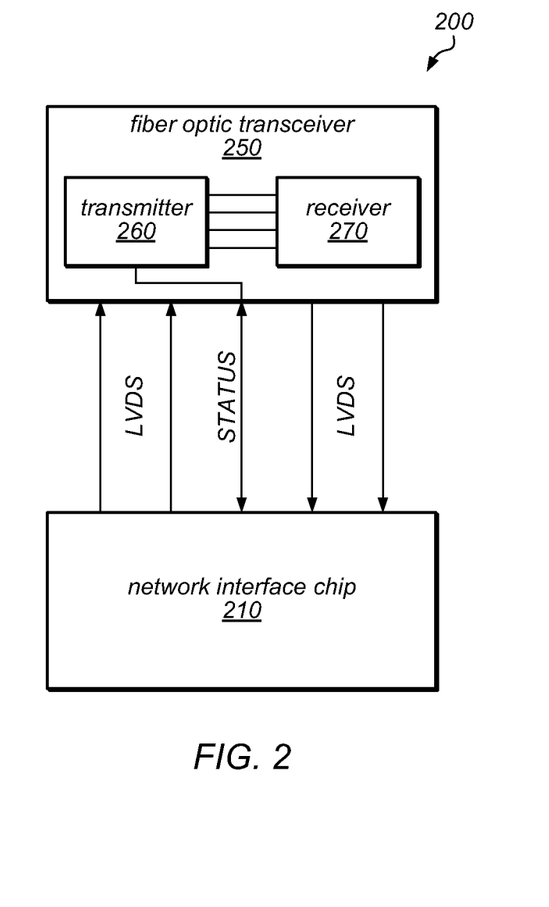
FIG. 2 illustrates an exemplary system block diagram of a portion of a device, according to one embodiment.

FIG. 2—Exemplary Block Diagram of a Device

FIG. 2 illustrates an exemplary block diagram of a device 200, e.g., which may be included in the network 100. More specifically, the block diagram of FIG. 2 may apply to any of the devices shown in FIG. 1.

As shown, the device 200 may include a network interface chip 210 and a fiber optic transceiver 250. As also shown, the fiber optic transceiver 250 may include a transmitter 260 and a receiver 270, which are coupled to each other. As also shown, the fiber optic transceiver 202 may be coupled to the network interface chip 208 via one or more lines or pins. More specifically, there may be two LVDS lines from the network interface chip 208 and two LVDS lines from the fiber optic transceiver 202. Additionally, there may be a bidirectional line between the transmitter 204 of the fiber optic transceiver 202 and the network interface chip 208 which may provide STATUS information.

Figure 3:
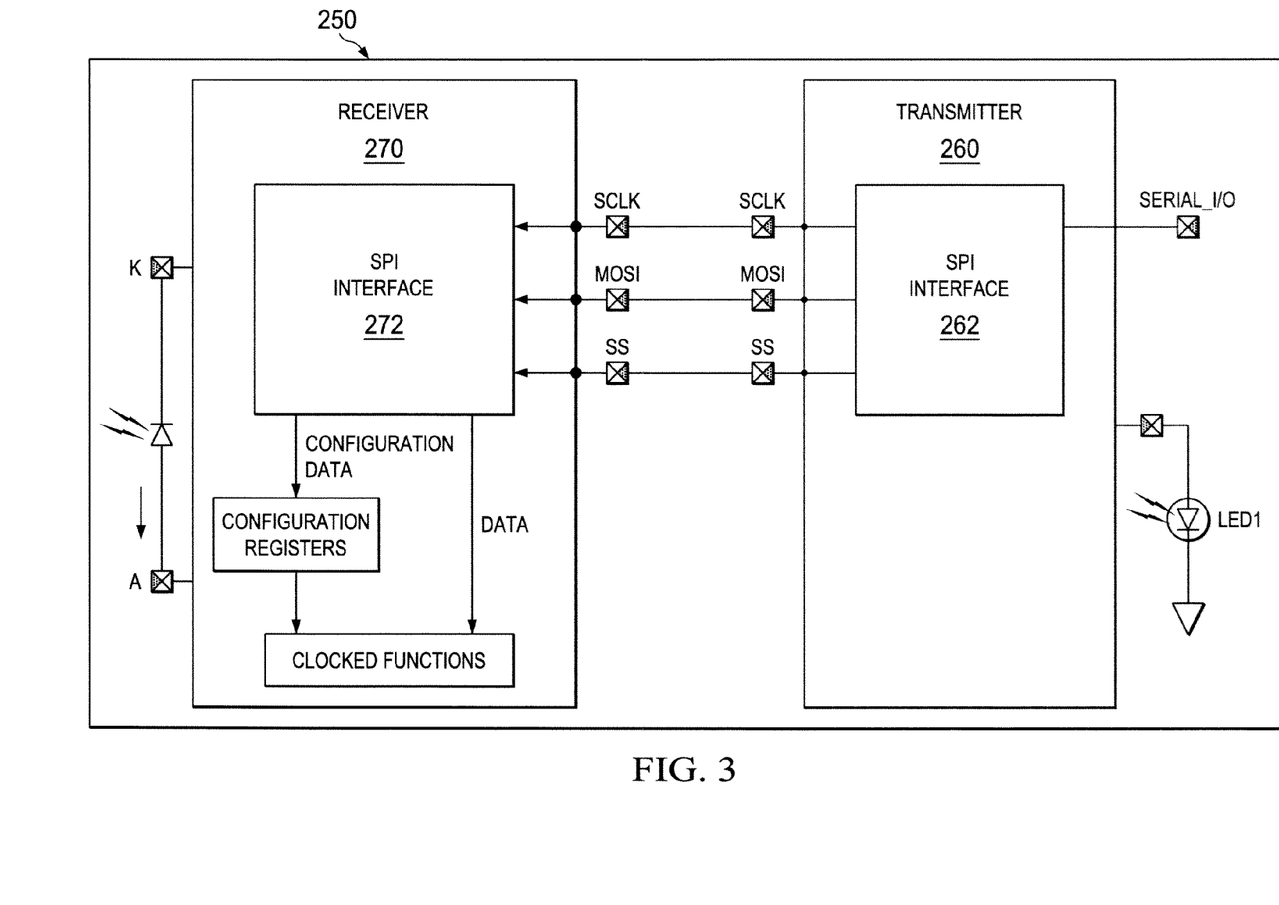
FIGS. 3 and 4 are block diagrams of exemplary transceivers, according to one embodiment.
Figure 4:
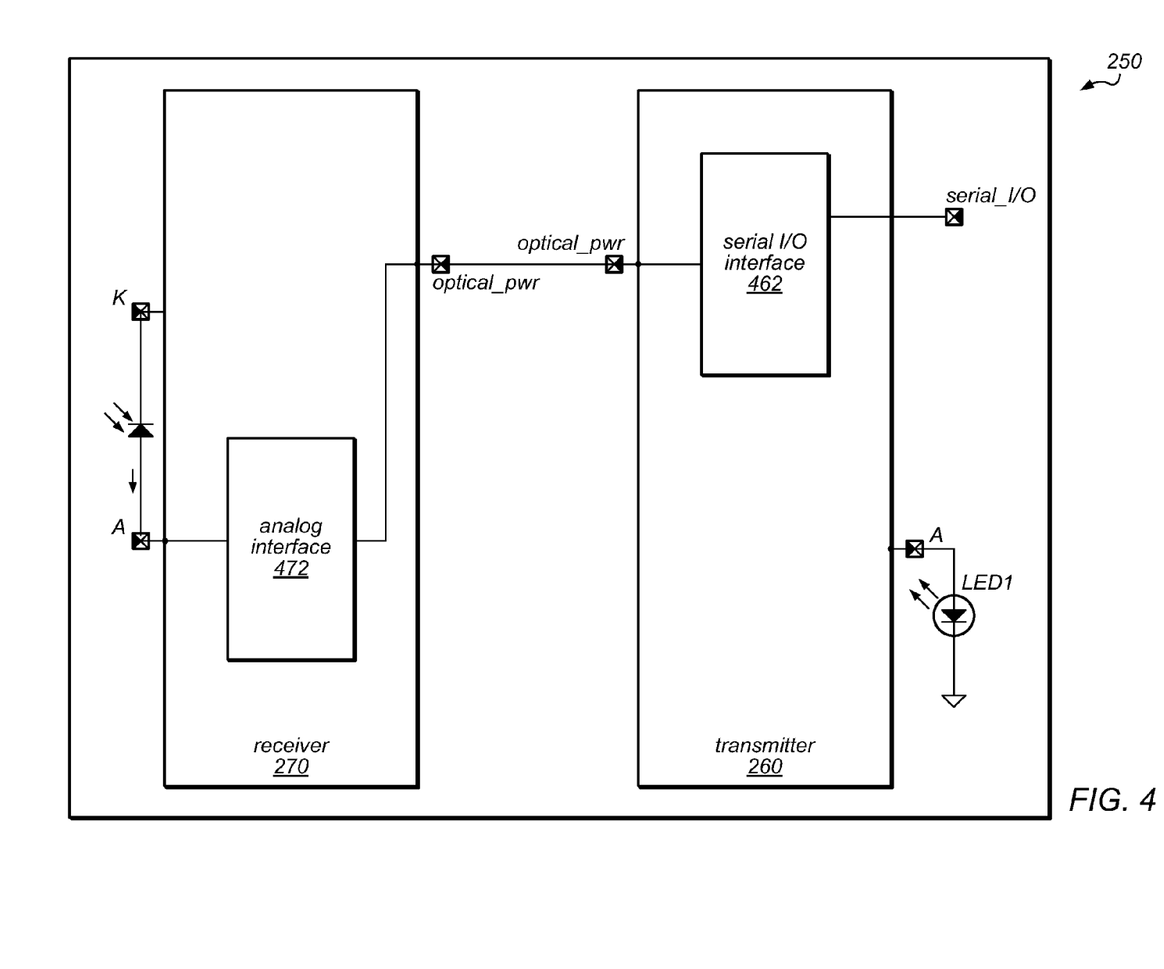

FIGS. 3 and 4—Fiber Optic Transceiver 250

FIG. 3 illustrates one embodiment of a more detailed block diagram of the fiber optic transceiver 250. As shown, the transceiver includes the receiver 270 (e.g., implemented as a first chip), which may be implemented as a sensitive optical receiver, and the transmitter 260 (e.g., an LED driver). In one embodiment, the receiver 270 and transmitter 260 may be comprised within the same optical assembly along with a photodiode and LED.

As shown, the receiver 270 and the transmitter 260 are coupled via a serial bus. More specifically, the receiver includes a serial peripheral interface (SPI) 272 which is coupled to the SPI 262 of the transmitter 260. In this particular embodiment, the SPIs 272 and 262 communicate using three lines from the SPI interface 262 to the SPI interface 272, one for SCLK (serial clock), one for MOSI (e.g., for data), and one for SS (slave select). As was shown in FIG. 2, the transmitter may be directly coupled to the network interface chip 210, while the receiver 270 may not.

Thus, this system allows the two chips to transfer serial data between them across a SPI (e.g., a 3 pin SPI). As discussed below, the receiver 270 may be configured to receive important settings from the transmitter 260 that is also configured to serially communicate with the network interface chip 210. The network interface chip 210 may be configured to serially send and receive data to and from the transmitter 260 (e.g., via the serial I/O pin), which can then serially shift important settings data to the receiver 270. Since the chip to chip transaction may be performed rarely, the receiver 270 can remain quiet of digital noise and optimize receive sensitivity while monitoring the photodiode. More specifically, in one embodiment, the receiver 270 may not perform analog to digital conversion and/or digital to analog conversion (e.g., it may not have circuitry that is able to perform such conversions or such circuits may not be utilized), may not receive clock signals (e.g., from the transmitter 260), may not generate clock signals (e.g., it may not be configured to generate clock signals), may not have state transitions (e.g., such as digital state transitions), may not have flip flop toggling, etc. during normal operation, such as while receiving optical data from devices on the network 100.

FIG. 4 illustrates another embodiment of a more detailed block diagram of the fiber optic transceiver 250. In this embodiment, the receiver 270 may be configured to determine optical power being received by a photodiode. The analog interface 472 may be configured to provide this power reading, e.g., via voltage or current, to the transmitter 260, e.g., via serial I/O interface 462. In the embodiment of FIG. 4, the transmitter 260 may be configured to perform analog to digital conversion of this information and communicate the resulting digital information to the network interface chip 210 through a serial I/O pin (e.g., the STATUS line shown in FIG. 2). Accordingly, the noisy translation of the optical power signal to digital domain may be performed by the transmitter 260 rather than the receiver 270, thereby allowing the receiver 270 to remain quiet and be better able to translate sensitive optical inputs from the photodiode, e.g., without interference from digital oscillations.

Note that the embodiments of FIGS. 3 and 4 may be implemented separately, or may be combined, as desired. For example, the analog interface 472 of FIG. 4 may utilize the SPI interfaces shown in FIG. 3 to perform communication. Additionally, or alternatively, the analog interface 472 may be combined or included as a part of the SPI interface 272, as desired. Similarly, the serial I/O interface 462 may be implemented as (e.g., all or a portion of) the SPI interface 262. For example, the SPI interfaces 272 and 262 may be modified to include an additional line for providing the optical power information from the receiver 270 to the transmitter 260.

Figure 5:
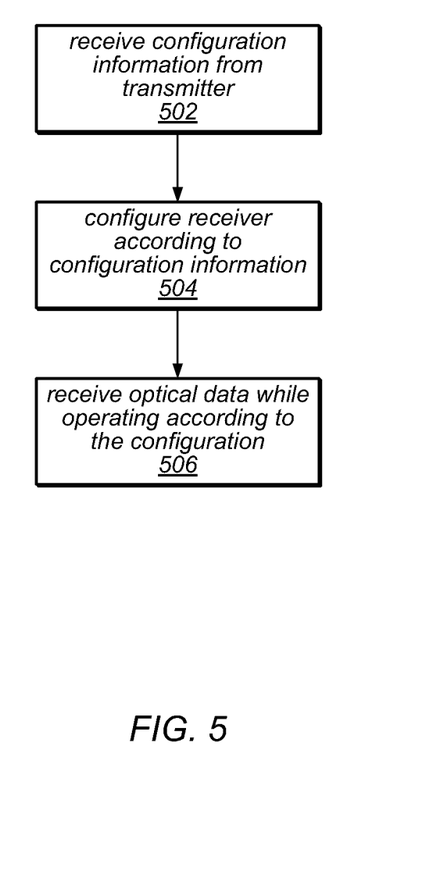
FIGS. 5 and 6 are flowchart diagrams illustrating embodiments of methods related to performing optical communication.

FIG. 5—Configuring an Optical Receiver

FIG. 5 illustrates a method for configuring an optical receiver. The method shown in FIG. 5 may be used in conjunction with any of the computer systems or devices shown in the above Figures (e.g., particularly with respect to FIG. 3), among other devices. In various embodiments, some of the method elements shown may be performed concurrently, in a different order than shown, or may be omitted. Additional method elements may also be performed as desired. As shown, this method may operate as follows.

In 502, at a first time, the transmitter may provide configuration information to the receiver. In one embodiment, the first time may occur during or proximate to (e.g., within a few seconds of) a power up of the transceiver or the device that includes the transceiver. For example, the transmitter may determine that the receiver is powered, and may then provide configuration information to the receiver. Note that configuration information may also be provided at other times, e.g., during operation, as discussed in more detail below.

In one embodiment, the transmitter may provide the configuration information using a serial bus, e.g., where the transmitter and receiver each have a respective serial peripheral interface (SPI), such as the embodiment shown in FIG. 3. During this transmission, the receiver may operate or receive the data using a clock, e.g., which is provided by the transmitter over the serial bus. Additionally, during this transmission, various oscillations (e.g., digital oscillations), electronic state changes (e.g., digital state changes), flip flop transitions, analog to digital or digital to analog conversions, etc. may occur for the receiver. Said another way, the transmission may cause the receiver to be "noisy" which would impeded sensitive measurements of optical signals during normal operation.

In 504, during and/or after transmission, the receiver may configure itself according to the received configuration. For example, in one embodiment, the transmission may result in storage of the configuration information in various registers (e.g., configuration registers) of the receiver. The receiver may use this data to configure itself. In one embodiment, the data for each register may be provided on each clock signal. Additionally, the receiver may only configure itself if the number of clock signals match the number of registers. Alternatively, the receiver may be automatically configured without any further actions based on the data being stored in the registers.

In 506, after configuration, the receiver may receive optical data, e.g., from another device on the network. While receiving the optical data, the receiver may operate "quietly". For example, the receiver may not receive the clock from the transmitter while receiving the optical data. In one embodiment, no (or limited) oscillations (e.g., digital oscillations) may occur on the receiver while receiving the optical data or subsequent to the transmission of configuration information from the transmitter. Additionally, or alternatively, no state changes (e.g., digital state changes), flip flop transitions, analog to digital or digital to analog conversions, etc. may occur on the receiver so that it may receive and detect optical signals of the optical data with greater sensitivity. In one embodiment, all of the circuitry that the receiver might normally have which cause the receiver to be "noisy" (such as analog/digital conversion circuitry) may be shifted to the transmitter in order to allow the receiver to be more sensitive. Thus, during operation, the transmitter may include the "noisy" circuitry, while allowing the receiver to operate quietly and with greater sensitivity.

While the above is discussed with respect to an initial configuration (e.g., based on calibrations that may have been performed during testing), configurations may also be provided at other times, e.g., during operation, such as in response to changes to the quality of received optical signals. For example, in response to a change in quality of the optical signals, a second configuration may be received and used by the receiver. Accordingly, during reception a noisier environment may be required (e.g., as a result of using the clock provided by the transmitter), but may become quiet after the transmission is complete. The new configuration may be based on a calibration procedure, e.g., determined by the receiver, transmitter, and/or controller based on current conditions. Note that the receiver may need to enter a calibration or configuration state (e.g., stop receiving optical data) in order to receive the new configuration. After the new configuration is received, the receiver may continue to receive optical data from the network. Thus, configurations may be provided to the receiver during operation, e.g., in a dynamic fashion.

Figure 6:
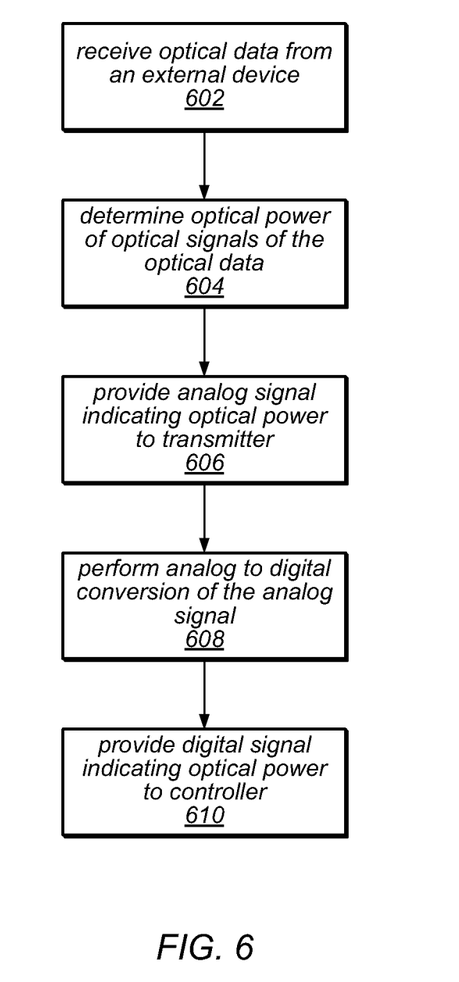

FIG. 6—Providing Optical Power Information

FIG. 6 illustrates a method for providing optical power information. The method shown in FIG. 5 may be used in conjunction with any of the computer systems or devices shown in the above Figures (e.g., particularly with respect to FIG. 4), among other devices. In various embodiments, some of the method elements shown may be performed concurrently, in a different order than shown, or may be omitted. Additional method elements may also be performed as desired. As shown, this method may operate as follows.

In 602, a receiver may receive optical data from an external device (e.g., from another device within a common network, such as the one shown in FIG. 1). In one embodiment, the receiver may have been initially configured in the manner described above, e.g., with respect to FIG. 5.

In 604, the receiver may determine optical power of one or more optical signals of the optical data. More specifically, the receiver may have measurement circuitry which is able to measure the optical power of the received optical signals.

In 606, the receiver may provide information indicating optical power (e.g., of currently received optical signals) to the transmitter. For example, the receiver may include an analog interface which is able to provide an analog signal indicating the current optical power to the transmitter. In some embodiments, this transmission may occur over a serial bus using respective SPIs.

The transmitter, in turn, may provide an indication of the optical power to the controller or network interface chip of the first device. For example, the transmitter may receive the analog signal (e.g., indicated by a voltage or current) and, in 608, perform analog to digital conversion to generate a digital signal that indicates the optical power. Accordingly, in 610, the transmitter may provide the digital signal to the controller or network interface chip of the first device. These signals may be used by the controller or network interface chip for a variety of reasons. For example, the controller may determine new calibration settings or an update to the settings of the receiver or transmitter based on the received signal. In one embodiment, updates to the receiver may be provided via the transmitter using the serial bus.

By shifting the analog to digital conversion to the transmitter and having the transmitter provide the optical power information, a number of advantages are achieved. First, were the analog to digital conversion performed on the receiver, the receiver's sensitivity of the optical signals may be reduced, which may be particularly deleterious in situations where the signal-to-noise ratio is very low, which is often the case in ring networks. Additionally, because the receiver sends an analog signal in this embodiment, the power consumed by the receiver may be lower than it would be if it performed analog to digital conversion. Finally, since the transmitter is able to provide the optical power information to the controller, a pin may not be required for communication between the receiver and then controller. Instead, a pin of the transceiver may be used for communication between the transmitter and the controller. Correspondingly, the transmitter may act as a go-between for the receiver and controller. Accordingly, the transceiver chip may require one less pin than in other implementations, which results in large cost savings and efficiency.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for receiving optical data, comprising:
   an optical receiver receiving optical data from first optical transmitter wherein the receiver includes circuitry operable for receiving the optical data, wherein the receiver includes certain components that operate according to a clock and wherein the components can be disabled;
   the optical receiver receiving one or more clocks from second optical transmitter wherein the one or more clocks are used to operate the components and wherein one or more of the components are disabled if the a clock of the one more clocks used to operate these components is not received from the second optical transmitter;
   the optical receiver receiving configuration information wherein the configuration information is used to disable a selection of components of the optical receiver that operate according to a clock of the one or more clocks:
   the optical receiver receiving optical data according to the configuration information, wherein the selection of components of the optical receiver are disabled and
   wherein the optical receiver operating without the selected disabled components allows the optical receiver to receive the optical data with greater sensitivity.

2. The method of claim 1, further comprising:
   the optical receiver receiving configuration information wherein the configuration information indicates the one or more clocks being transmitted from the second optical transmitter.

3. The method of claim 1, further comprising: the optical receiver ceasing reception of optical data prior to said receiving the configuration information.

4. The method of claim 1, wherein the optical receiver receiving the configuration information is performed in response to a change in optical qualities of the optical data during said receiving of the optical data.

5. The method of claim 1, further comprising: the optical receiver receiving the one or more clocks from the second optical transmitter during said receiving the configuration information.

6. The method of claim 1, further comprising; the optical receiver configuring itself according to the configuration information prior to said receiving the optical data, wherein said configuring information comprises a number of clock signals with corresponding data, wherein the number of clock signals matches a number of registers of the optical receiver designated to store configuration information.

7. The method of claim 1, wherein said receiving the configuration information is performed over a serial bus using a serial peripheral interface (SPI).

8. The method of claim 1, wherein while receiving the optical data according to the configuration information, the optical receiver does not perform analog to digital or digital to analog conversion.

9. The method of claim 1, wherein while receiving the optical data according to the configuration information, the optical receiver does not operate with digital state changes or flip flop toggles.

10. The method of claim 1, wherein the first optical transmitter and the second optical transmitter are the same optical transmitter.

11. A method for configuring an optical receiver, comprising:
   an optical transmitter determining that an optical receiver is powered up;
   the optical transmitter providing one or more clocks to the optical receiver;
   the optical transmitter ceasing to provide a disabled clock of the one or more clocks to the optical receiver, wherein the components of the optical receiver that rely on the disabled clock are disabled;
   the optical receiver receiving configuration information wherein the configuration information is used to disable a selection of components of the optical receiver; and
   the optical receiver receiving optical data according to the configuration information wherein the selection of components of the optical receiver are disabled;
   wherein operating without the selected disabled components allows the optical receiver to receive optical data with greater sensitivity.

12. The method of claim 11, further comprising:
   providing the optical receiver with configuration information indicating the one or more clock signals provided by the optical transmitter; and
   configuring a register of the optical receiver for each of the one or more clock signals indicated by the configuration information.

13. The method of claim 12, wherein said providing the configuration information is performed over a serial peripheral interface (SPI).

14. An optical transceiver, comprising:
   an optical receiver coupled to a photodiode, wherein the optical receiver is configured to receive optical signals via the photodiode, wherein the optical receiver comprises a first serial peripheral interface (SPI);
   an optical transmitter, wherein the optical transmitter is configured to transmit optical signals using a light emitting diode (LED),
   wherein the optical receiver comprises a second SPI, wherein the optical receiver and the optical transmitter are coupled over a serial bus using the first and second SPIs;
   wherein the optical transmitter provides a clock signal to the optical receiver over the serial bus, and wherein selected components of the optical receiver that operate according to the clock signal are disabled if the optical transmitter ceases to provide the clock signal to the optical transmitter;
   wherein the optical receiver receives configuration information wherein the configuration information is used to disable a selection of components of the optical receiver;
   wherein the optical receiver receives optical data according to the configuration information, wherein the selection of components of the optical receiver are disabled; and
   wherein operating without the selected disabled components allows the optical receiver to receive the optical data with greater sensitivity.

15. The optical transceiver of claim 14, wherein the optical transmitter is configured to determine that the optical receiver is powered up, wherein the optical transmitter provides the configuration information in response to the determination that the optical receiver is powered up; wherein the configuration information indicates one or more clock signals provided by the transmitter to the receiver.

16. The optical transceiver of claim 14, wherein providing the configuration information comprises providing a number of clock signals with corresponding data, wherein the number of clock signals corresponds to a number of registers of the optical receiver designated to store configuration information.

17. The optical transceiver of claim 14, wherein the optical receiver stops receiving the optical data prior to receiving the updated configuration information.

18. The optical transceiver of claim 14, wherein the optical receiver receiving the updated configuration information is performed in response to a change in optical qualities of the optical data received.

19. The optical transceiver of claim 14, wherein the optical receiver periodically receives updated configuration information from the transmitter in response to changes in optical signal quality.

\* \* \* \* \*